May 14, 1940.  C. L. MITCHEL ET AL  2,200,514
COMBINED CHURN AND BUTTER WORKER
Original Filed July 23, 1934  2 Sheets-Sheet 1

Inventors
C. L. Mitchel
E. L. Wetmore
by Hazard and Miller
Attorneys.

May 14, 1940.  C. L. MITCHEL ET AL  2,200,514
COMBINED CHURN AND BUTTER WORKER
Original Filed July 23, 1934   2 Sheets-Sheet 2

Inventors
C. L. Mitchel
E. L. Wetmore
by Hazard and Miller
Attorneys.

Patented May 14, 1940

2,200,514

UNITED STATES PATENT OFFICE 2,200,514

COMBINED CHURN AND BUTTER WORKER

Clyde L. Mitchel, Elmonte, and Elbert L. Wetmore, Alhambra, Calif., assignors to Challenge Cream & Butter Association, Los Angeles, Calif., a corporation of California Application July 23, 1934, Serial No. 736,544

15 Claims. (Cl. 31—33)

Our invention relates to apparatus for churning milk and cream and/or working, and in particular, to a combined churn and butter worker.

It has been the practice to make combined churns and butter workers with wooden walls for the reason that butter will not stick to wood under the conditions in which the cream is churned or the butter is worked in the apparatus. This lack of sticking of butter to the wooden walls of combined churns and butter workers is due to the fact that there is present upon the surface of the wood a film of water which tends to act as a hydraulic cushion between the wood and the butter, preventing direct contact of one with the other in ordinary operations and, consequently, preventing sticking of butter to the walls of the churn. In other words, it may be said that the wood used has sufficient surface adhesion tension to water and brine to hold upon its surface a film of water with sufficient tenacity to resist rupture under the impact of a mass of butter thereon. Obviously, highly polished woods of such nature as to lack the requisite film of water would be impractical for use in the construction of churns.

The use of wood for churns and butter workers has, however, certain well known defects which are well recognized in the art but have been considered as necessary evils. Not only does wood sometimes impart an objectionable woody flavor to the butter, particularly when the apparatus is new, but for the further and more important reason that wood churns, because of the porous nature of the wood and the numerous joints of the parts composing the walls of the churns, are difficult to thoroughly clean and sterilize with the result that yeasts, molds and bacteria generally become established therein to the consequent contamination of the butter. Furthermore, wood is a poor conductor of heat and it requires boiling for a considerable length of time to sterilize a wooden churn for heat penetrates the wood very slowly so that the organisms in joints, cracks and irregularities in the surface are not easily destroyed by heat treatment and the churn does not dry as rapidly after draining as is desirable. The points where drying is especially slow may be points where milk solids tend to accumulate so that conditions favorable for the growth of micro-organisms are developed. The protection of organisms in the churn also interferes with their destruction by chemicals.

The use of metal naturally suggested itself to those skilled in the art of butter making for metals are good conductors of heat, are substantially non-porous, and can easily be sterilized; but while in practically every respect superior to wood it was found that metal could not be used for the reason that butter would stick to it. There was no surface film of water of sufficient tenacity to resist rupture under the impact of a mass of butter thereon. As late as May 10, 1933, the National Butter and Cheese Journal, on page 7, stated:

"Metal and glass cannot absorb water, therefore cannot contribute to the maintenance of the water film. It is impossible to prepare metal or glass so that fat will not stick to it. We see this on bolt heads and peepglasses in churns.

"We have used sheet metal, earthen ware, and glass hand churns but find the principle holds true in all. This is the big reason why wood is still used for churns."

The attempts made to use metal for churns were with sheet metal which, as stated, does not form the surface film of water. It was, therefore, concluded that metal was entirely unsuitable.

We have made the discovery that metal will form a film of water with sufficient tenacity on its surface provided the metal is cast metal. The surface of cast metal, even though it may be machined, is of such a physical condition, in contradistinction from rolled or other metal, such as deposited by electrolysis, that a film of water will form and then it may be used for the walls or lining of walls of churns and butter workers. We have made extensive experiments along this line of investigation in which we have tested out the metals and metal alloys of common use, omitting only the precious metals such as silver, gold, platinum, and the like, which from a practical standpoint would be prohibitive because of their cost and which need not be considered in view of the fact that we have found several inexpensive metals which answer the purpose admirably. While we have found that cast metal or cast metal alloys of any kind possess this property of holding upon their surface a film of water with sufficient tenacity to resist rupture under the impact of a mass of butter thereon, the choice of such metals and/or alloys is greatly limited for the reason that practically all metals impart a metallic flavor to the butter which, of course, prevents their use in churns and butter workers. The following list of metals showing the nature of the surface and indicating whether butter works free therefrom or will stick thereto, as well as the flavor imparted to the butter, and the appearance of metal after use, is shown: be ingested by some person using the butter, with very serious consequences.

*Reaction of butter to various metals*

| Metal | Surface | Working | Flavor | Appearance of metal |
|---|---|---|---|---|
| Manganese bronze | Cast | Free | Metallic | Tarnished. |
| Cast iron | do | do | do | Do. |
| Cast copper | do | do | do | Do. |
| Cast zinc | do | do | Good | Bright. |
| Cast tin | do | do | Metallic | Tarnished. |
| Silver bronze | do | do | do | Do. |
| Bronze | do | do | do | Do. |
| Brass | do | do | Good | Slightly tarnished. |
| Cast "S" aluminum | do | do | Metallic | Tarnished. |
| Manganese bronze | Cast-machined | do | do | Do. |
| Iron | do | do | do | Do. |
| Copper | do | do | do | Do. |
| Zinc | do | do | Good | Bright. |
| Tin | do | do | Metallic | Tarnished. |
| Silver bronze | do | do | do | Do. |
| Bronze | do | do | do | Do. |
| Brass | do | do | Good | Slightly tarnished. |
| (5% silicon) aluminum "S" | do | do | | Tarnished. |
| USS 18—8 | 4A | Sticky | Questionable | Do. |
| Do | 2D | do | do | Do. |
| Do | 7 | Free | Slightly metallic | Do. |
| USS 25—12 | Pickle finish slightly cold rolled. | do | Good | Slightly tarnished. |
| Everdur | Rolled | Sticky | Metallic | Tarnished. |
| Tinned iron | Tinned | Free | Good | Bright. |
| Tin foil | Rolled | Sticky | do | Do. |
| Herculoy | do | do | Fishy | Tarnished. |
| Copper | Cold rolled | Free | Metallic | Do. |
| Do | Hot rolled | Sticky | do | Do. |
| Brass | Rolled | do | do | Do. |
| Nickel silver | do | do | do | Bright. |
| Inconel | Cold rolled | do | do | Do. |
| Pure nickel | Rolled | do | do | Do. |
| Chromoloid | Plated | do | Slight metallic | Do. |
| Copper plated monel | do | do | Metallic | Tarnished. |
| Monel | Rolled | do | do | Do. |
| Bronze | do | do | do | Do. |
| Chromium plated copper | Plate | do | Good | Bright. |
| Aluminum | Anodic | Free | do | Tarnished. |
| Dow metal | Rolled | Sticky | Metallic | Do. |
| Allegheny metal | Polished rolled | do | Good | Bright. |
| Do | White pickle | Free | Questionable | Tarnished. |
| Do | Sand blasted | Free (temp.) | Good | Do. |
| Do | Filing blasted | do | Slight metallic | Do. |
| Resistol | Sand blasted | Free | do | Do. |
| Sheet aluminum (hard) | Rolled | Sticky | Good | Bright. |
| Sheet aluminum (soft) | do | do | Slight metallic | Do. |
| Sheet aluminum (hard) | Sand blasted | Free (temp.) | Good | Do. |
| Sheet aluminum (soft) | do | do | Slight metallic | Do. |
| Body steel | Rolled | Sticky | Metallic | Tarnished. |
| Cast aluminum "P" (2% magnesium). | Cast | Free | Good | Bright |

The metals common to milk equipment are few. The group comprises iron, copper, tin, nickel, aluminum, chromium, and various alloys involving one or more metals from this group and small amounts of other metals. The tendency of various metals to affect the flavor of milk and milk products is well known. In general, however, the data concerning the inter-effects of metals and milk omit consideration of a very important ingredient of butter; namely: sodium chloride. Several metals commonly used in milk equipment suffer serious corrosion when exposed to sodium chloride in the concentrations common to butter. It is obvious, therefore, that the metal selected for construction of a churn must fulfill requirements as to resistance to the various constituents of milk and cream and, in addition, must be resistant to sodium chloride brine. We have observed that some metals normally without flavor effect upon milk or cream have a decided effect upon the flavor of butter after the salt has been added.

Attempts have been made in the prior art to make churns of glass and to modify the surface thereof by sand blasting the same so that a film of water of sufficient tenacity would be formed. The glass churns are objectionable because they are liable to chip. The same is true of sand blasted enamel churns, with the grave danger that chips of glass or enamel may subsequently We have also experimented with sand blasting metal surfaces other than cast metal to ascertain whether the surface could be modified so as to provide the necessary film of water but we found that the effect of sand blasting upon the surface was only temporary and that after some time of use the surface would revert to the ordinary condition, that is, it would no longer form the necessary film of water. On the other hand, we found that cast metal retains this property throughout the body thereof. The metal may be machined or become worn with use, still, however, retaining the capacity of forming the necessary film of water to prevent sticking of butter to the metal. Our investigations show that the adhesion tension of a metal to water may be increased by casting it and that by so doing a metal unsatisfactory in other forms may be made adaptable to the construction of a combined churn and butter worker.

Our invention consists in the discovery that cast metal and cast metal alloys have this property of forming a tenacious film of water and we have selected those metals that do not affect the flavor of butter and we have found of all metals that only two and their alloys are suitable, to wit: aluminum and tin, and such metals we use in churns or combined churn and butter workers and other apparatus used for the working or molding of butter. It is immaterial, as far as our invention is concerned, of what particular preferred construction the combined churn or butter worker is made, but we illustrate by way of example in the accompanying drawings such an apparatus in which, preferably, the entire interior walls are made of cast metal, either solid or lined therewith.

In the accompanying drawings we have illustrated by way of example apparatuses for churning milk or cream and/or working butter, and in which.

Figure 1:
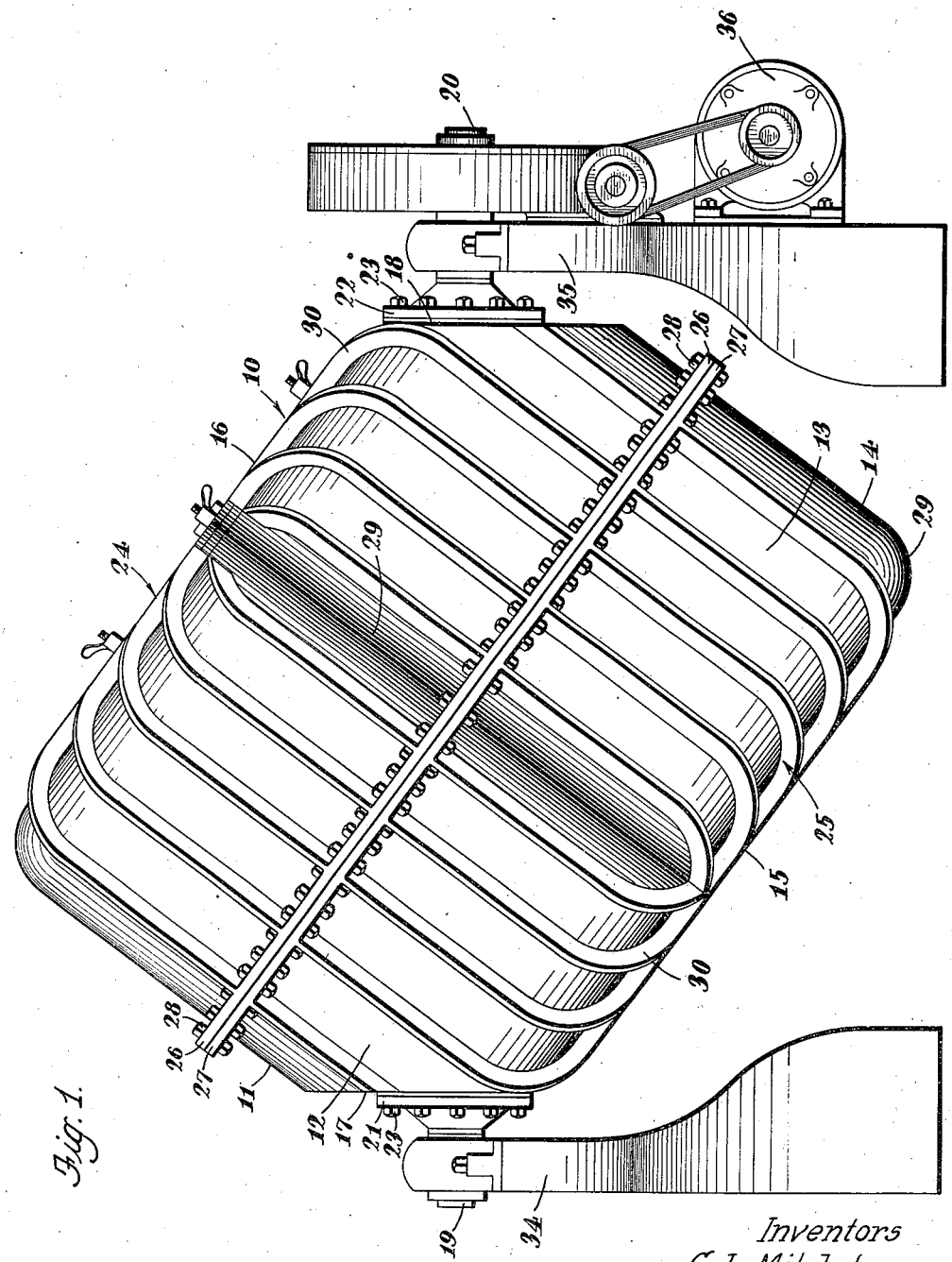
Fig. 1 is a front elevation of a butter churn embodying our invention.
Figure 2:
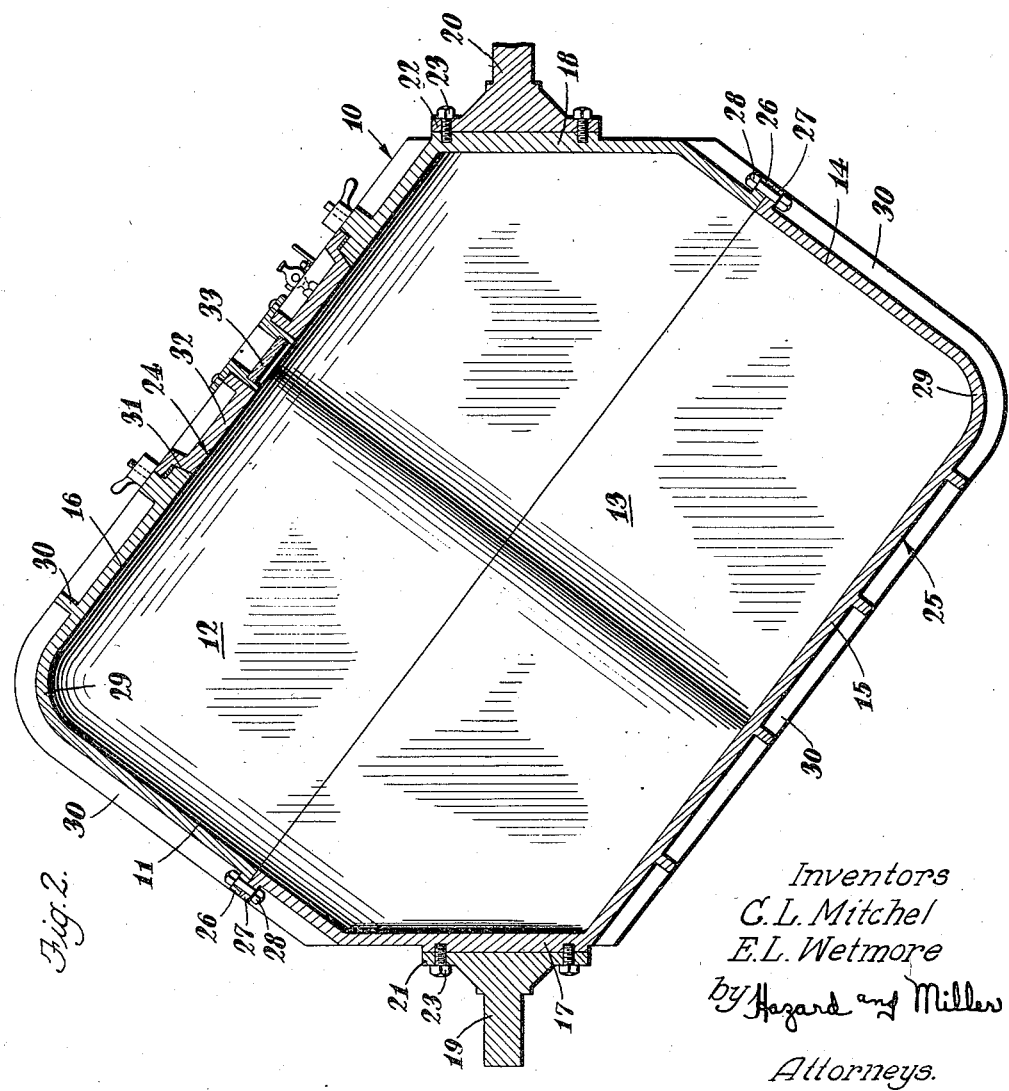
Fig. 2 is a vertical, central section of the churn shown in Fig. 1, omitting the standards and driving mechanism.

Referring to the drawings, 10 indicates generally the churn vessel which is approximately in the form of a hollow cube and, therefore, embodies six walls which, for the purposes of description, will be referred to as comprising four side walls 11, 12, 13, 14, a bottom wall 15, and a top wall 16. In carrying out the invention the vessel is mounted to revolve around an axis which extends through diagonally opposed corners of a cubiform structure, which opposed corners, however, are removed, and are replaced by flat walls 17 and 18 constituting end walls which extend parallel with each other and are disposed perpendicular to the horizontal; each of the end walls being substantially in the form of a triangle in general outline. By the provision of the end walls 17 and 18 internal pyramidal pockets at the axially aligned ends of the vessel are avoided and at the same time flat faces are provided on the exterior of such walls to form seats for a pair of axially aligned trunnions 19 and 20, which latter are formed at their inner ends with annular flanges 21 and 22 which are secured to the walls 17 and 18, respectively, as by bolts 23. The vessel 10 is formed of cast metal, preferably in two sections 24 and 25, each of which is here shown as comprising one half of the cubiform structure divided intermediate the top and bottom walls thereof, the section 24 including one half the side walls 11, 12, 13 and 14; the top wall 16 and the end wall 18; and the section 25 comprising the other half of the side walls, the bottom wall 15 and the end wall 17. The sections 24 and 25 are formed with marginal flanges 26 and 27 which seat on each other and are united by bolts 28 whereby the sections are joined together on a plane extending diagonally of the axis of a structure. However, in some instances the several walls of the vessel may be cast in one piece, in which event the flanges and bolts will be dispensed with.

In order to avoid angles at the intersections of the adjacent side walls and at the intersections of the side walls to the top and bottom walls such intersections are rounded as indicated at 29, which results in the corner portions of the structure also being rounded.

The exterior of the vessel walls is reinforced by a series of webs 30 which are cast integral with the walls and such webs may be disposed in any desired arrangement to provide the requisite strength. The top wall 16 is provided with a suitable opening 31 fitted with a removable closure 32 provided with a transparent plate 33. Means for venting gases and withdrawing samples of the contents of the churn for inspection and draining valves and the like may be provided, as is customary in the art, and it is not necessary to refer to them in detail.

The trunnions 19 and 20 are revolvably supported on suitable bearings carried on standards 34 and 35 and are rotated by a suitable source of power, such as a motor 36, operatively connected to trunnion 20.

As stated before, the invention does not reside in any particular construction of the churn for working butter but in the material used for the surfaces with which the cream or the butter or both come in contact. The sections composing the vessel 10 of the churn are preferably made of solid cast metal. However, it is not necessary that the same be made of solid cast metal provided that the surfaces which come in contact with the cream and/or butter are made of a lining of metal to which butter will not stick under the conditions in which the butter is worked nor will the flavor of the butter be unfavorably affected. The metal that we use may be either cast aluminum and its alloys with other metals provided that the other elements of the aluminum alloy are such as will not destroy the general characteristic of the aluminum; that is to say: that the alloy will not impart an unfavorable flavor to the butter. The same applies to the metal tin, although ordinarily when tin is used iron and steel will be "tinned," that is, the surface will be dipped in a bath of tin, forming a layer of tin on the iron or steel, which layer of tin, it will be observed, is cast metal forming a more or less thick surface layer firmly bonded to the surface of the iron or steel.

We contemplate, also, the use of tinned sheets of other metal. As well known, metal is tinned by immersing the same in a molten bath of tin. The surface of tin is, however, cast metal and is included in our invention.

We might mention here that we have tested metals deposited by electrolysis or have used metal such as aluminum as the anode but find that, except, possibly, for a very short time, the metal so treated was unsuitable for our purpose for butter would soon stick to it, while in the case of the cast metal, as stated before, this property of forming a surface film of water is permanent.

It will be understood that by the term "aluminum" we do not intend to restrict ourselves to substantially pure aluminum but include commercial aluminum which contains small percentages of other metals or elements. For instance, aluminum containing five percent of silicon is found also excellent for our purpose, or aluminum containing a small percentage of magnesium, such as two percent.

When "tin" is used we, of course, mean not the chemical or pure metal but the commercial tin or alloys of tin in which, however, the other elements of the alloy are such as not to destroy the general characteristics of tin and, in particular, that the tin alloy will not affect the flavor of the butter unfavorably.

In the claims the term "cream" is intended to cover milk and/or cream, and the term "work" is intended to cover all kinds of manipulations such as working, conditioning or blending the butter for any purpose.

It will also be understood that our combined churn and butter worker may also be used for other purposes.

In a prior application for Combined churn and butter worker, Serial Number 650,104, filed January 4, 1933, the applicants have described the use of cast aluminum and cast aluminum alloys.

We claim:

1. A combined churn and butter worker comprising faces made of cast aluminum.

2. A combined churn and butter worker comprising faces made of cast tin.

3. A combined churn and butter worker comprising a container adapted to receive cream to be churned into butter, means for agitating the container, the interior faces of the container being made of cast aluminum.

4. A combined churn and butter worker comprising a container adapted to receive cream to be churned into butter, means for agitating the container, the interior faces of the container being made of cast alloy of aluminum containing approximately two percent magnesium.

5. A combined churn and butter worker comprising a container made of sections of cast aluminum, means to hold the sections in assembled relation, and means for agitating the container.

6. A combined churn and butter worker comprising a container made of sections of cast alloy of aluminum containing approximately two percent of magnesium, means to hold the sections in assembled relation, and means for agitating the container.

7. A combined churn and butter worker comprising a container adapted to receive cream to be churned into butter, the interior faces of said container being substantially smooth and made of cast aluminum.

8. A combined churn and butter worker comprising a container adapted to receive cream to be churned into butter, the interior faces of said container being substantially smooth and made of a cast alloy of aluminum containing approximately two percent magnesium.

9. A combined churn and butter worker comprising a container adapted to receive cream to be churned into butter, said container being made of sections of cast aluminum having substantially smooth inner faces, means to hold the sections in assembled relation, and means to agitate the container.

10. A combined churn and butter worker comprising a container adapted to receive cream to be churned into butter, said container being made of sections of cast alloy of aluminum containing approximately two percent magnesium having substantially smooth inner faces, means to hold the sections in assembled relation, and means to agitate the container.

11. A combined churn and butter worker comprising a container adapted to receive cream, the interior faces of said container being substantially smooth and made of cast alloy of aluminum containing a small percentage of silicon.

12. A combined churn and butter worker comprising a container adapted to receive cream, the interior faces of said container being substantially smooth and made of cast alloy of aluminum containing approximately five percent of silicon.

13. A combined churn and butter worker comprising a container adapted to receive cream, the interior faces of said container being substantially smooth and made of cast alloy of aluminum.

14. A combined churn and butter worker comprising a container adapted to receive cream to be churned into butter, the interior faces of the container being made of cast metal incapable, under normal conditions, of affecting the flavor of butter, said metal being from the group consisting of aluminum and tin.

15. A combined churn and butter worker comprising a container adapted to receive cream to be churned into butter, the interior faces of the container being made of cast metal incapable, under normal conditions, of affecting the flavor of butter, said metal being from the group consisting of aluminum, tin and their alloys.

CLYDE L. MITCHEL.
ELBERT L. WETMORE.